UNITED STATES PATENT OFFICE.

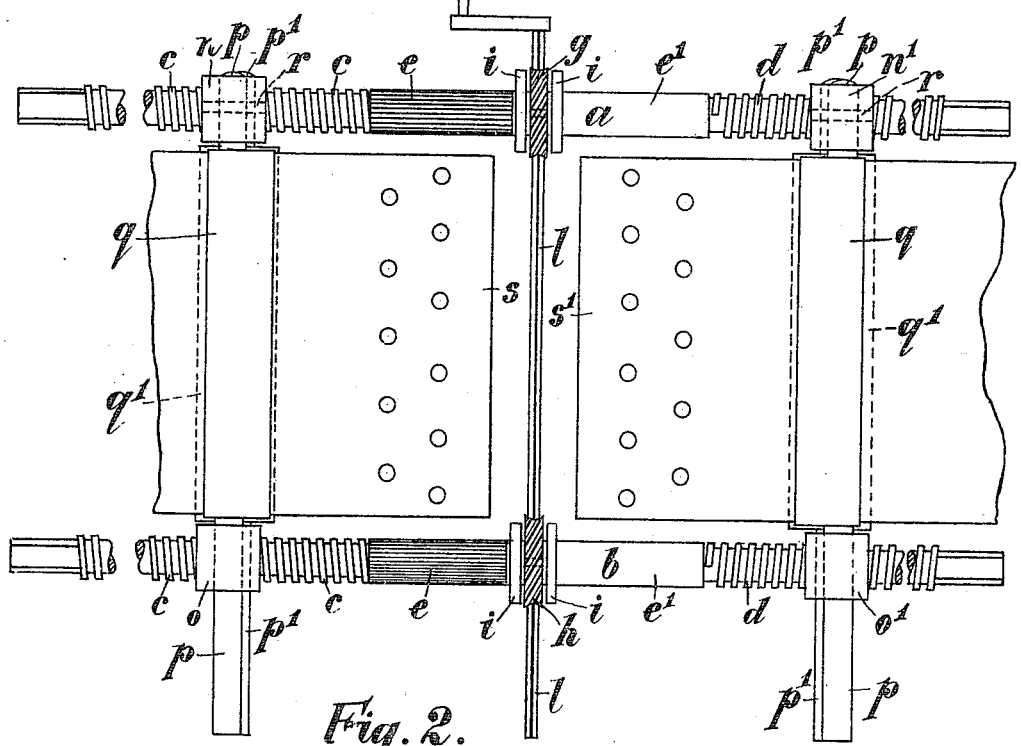
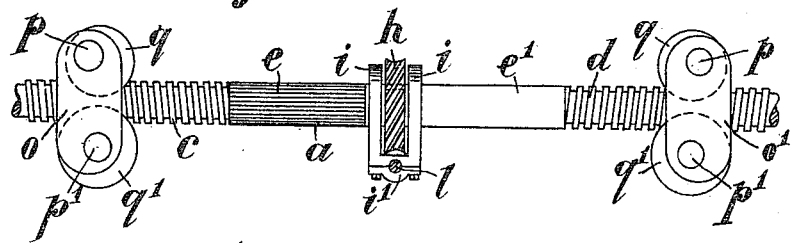
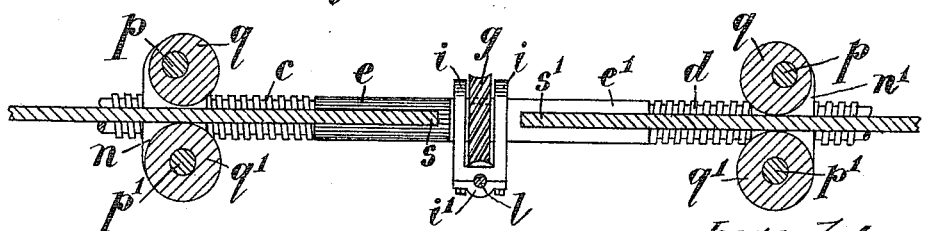

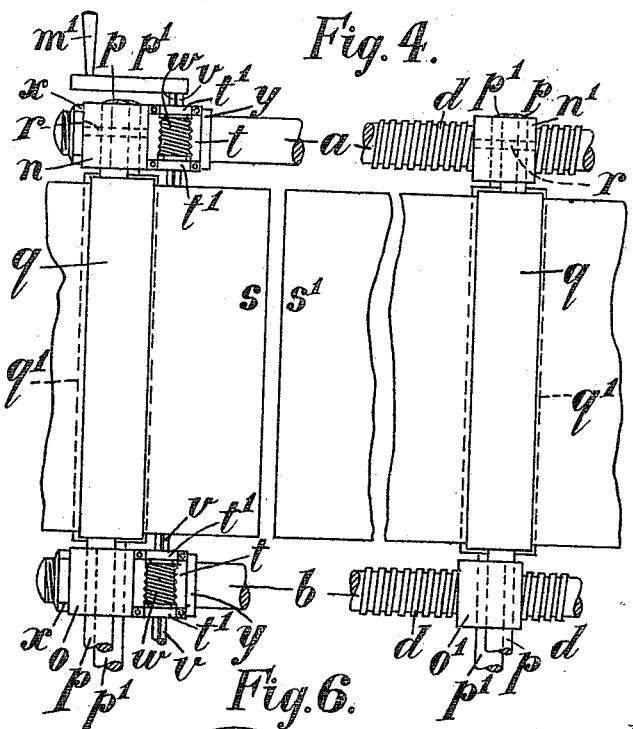
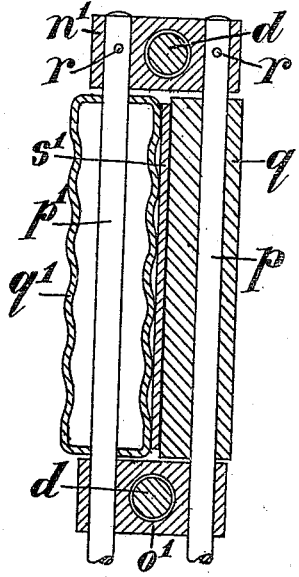
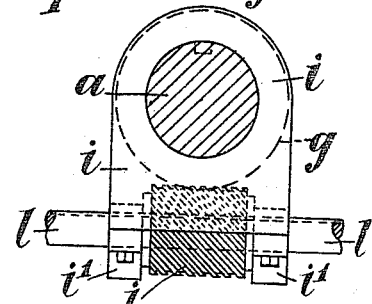
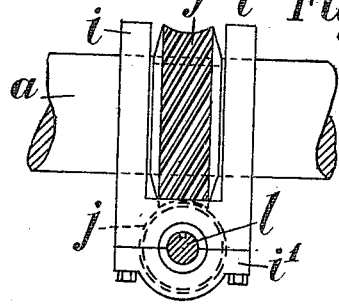
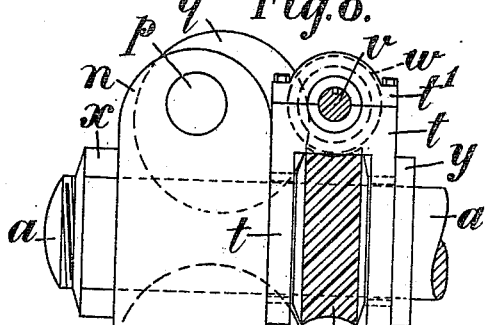
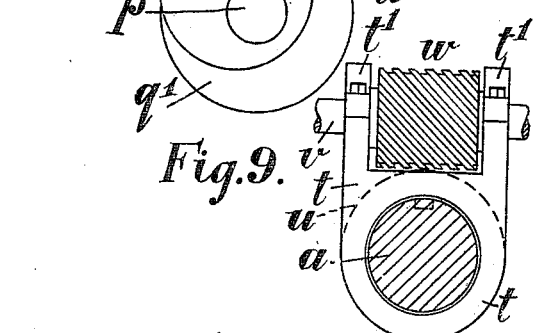

FREDERICK THOMAS, OF LONDON, ENGLAND.

BELT-STRETCHER.

979,599.  Specification of Letters Patent.  Patented Dec. 27, 1910.

Application filed March 25, 1910. Serial No. 551,441.

*To all whom it may concern:*

Be it known that I, FREDERICK THOMAS, a subject of the King of Great Britain, residing at Tooting, London, England, have invented a certain new and useful Improved Belt-Stretcher, of which the following is a specification.

This invention relates to belt stretchers of the class having a pair of longitudinal screwed spindles with nuts in engagement therewith and, secured to the nuts, two gripping arrangements capable of automatically gripping the ends of the belt in such manner that, on the said spindles being rotated by means of bevel or like gear, the nuts with their gripping arrangements are caused to traverse the spindles thereby stretching the belt.

The object of this invention is to provide an improved belt stretcher of this class wherein the axes of the screwed spindles are in the same plane as the belt being stretched, the gripping arrangements consisting each of a pair of cylindrical rollers which are arranged one on each side of the belt and one of which is mounted eccentrically so as to enable the belt to be gripped, the stretcher being capable of ready adjustment to suit belts of different widths, and the spindles being operated through worm gear.

In order that my said invention may be clearly understood I have hereunto appended an explanatory sheet of drawings, whereon:—

Figure 1 is a plan view of one form of my improved stretcher as it appears when applied to a belt. Fig. 2 is a side elevation thereof. Fig. 3 is a longitudinal section thereof. Fig. 4 is a plan view similar to Fig. 1, but showing a modified form of stretcher, the central portion being broken away. Fig. 5 is a cross-section through the rollers for gripping the belt. Figs. 6 and 7 are views of the worm gear $g$, $j$, of Fig. 1. Fig. 8 is a view of the nut $n$ and worm gear $u$, $w$ of Fig. 4. Fig. 9 is another view of the worm gear $u$, $w$, of Fig. 4.

Referring to Fig. 1 of the drawings:—
The stretcher consists of two spindles $a$, $b$, each made with a right hand screw thread $c$ and a left hand screw thread $d$. The part $e$ of each spindle is roughened to give a hand grip while the part $e^1$ is turned smooth and on the part $e^1$ of the spindle $a$ is keyed a worm or helical tooth wheel $g$, while on the spindle $b$ is likewise fitted a worm or helical tooth wheel $h$. Each spindle has slung or otherwise fitted on it a frame $i$ (see particularly Figs. 6 and 7,) each frame carrying in bearings $i^1$, a worm $j$ or helical tooth wheel having an internal key which is capable of engaging a key way in a spindle $l$ so as to be driven by the latter when the crank handle $m$ thereof is operated.

A nut $n$ is fitted on the part $c$, and a nut $n^1$ on the part $d$ of the spindle $a$ while a nut $o$ is fitted on the part $c$ and a nut $o^1$ on the part $d$ of the spindle $b$. Fitted rigidly in each nut $n$ and $n^1$ are two horizontally projecting round bars or fixed spindles $p$, $p^1$, upon which wood or other rollers $q$, $q^1$, are turnably threaded or mounted. The one roller of each pair is made so as to be eccentric of its bar while the other roller is made so as to be concentric with its bar. The arrangement is such that the axes of the spindles $a$, $b$, are in the same plane as the belt being stretched.

The bars $p$, $p^1$, at one end thereof may be secured fixedly to the nuts $n$, $n^1$, by means of pins $r$ or otherwise while the opposite ends which pass through the nuts $o$, $o^1$, are not so secured.

With this device when it is desired to draw the ends of the belt together, the spindle $a$ with its nuts $n$, $n^1$, bars $p$, $p^1$, worm wheel $g$ and frame $i$ with worm $j$ therein is held in position at one side of the belt, the bars $p$, $p^1$, projecting out laterally from and at right angles to the spindle $a$. Next, rollers $q$, $q^1$, of lengths suitable for the width of the belt, are threaded on to the bars $p$, $p^1$, above and below the belt respectively. Then the spindle $b$ is held at the opposite side of the belt to the spindle $a$ and the nuts $o$, $o^1$, thereof threaded on to the bars $p$, $p^1$, and thereafter the spindle $l$ is passed through the worms $j$, $j$, and the apparatus is ready for use. It is obvious that, by turning the spindle $l$ by the crank handle $m$ in the right direction, the worm $j$ and worm wheels $g$, $h$, will rotate the spindles $a$, $b$, and draw up the ends $s$, $s^1$, of the belt, the belt being gripped and held tight automatically by the action of the eccentric rollers $q$, $q$. When the ends of the belt have been drawn sufficiently close together, and the spindle $l$ drawn out of the worms $j$, $j$, and out of the way of the ends of the belt, the latter can be laced or otherwise secured whereupon the stretcher can be quickly dismantled by first slightly slackening the screw spindles $a$, $b$, so as to cause the rollers to release their grip of the belt and then pulling the spindle $b$ with its nuts $o$, $o^1$, and frame $i$ off the free ends of the bars or spindles $p$, $p^1$, the spindle $a$ with its rollers being simultaneously removed in the opposite direction.

In case of new or totally parted belts the whole appliance may be held intact, and the ends of the belt drawn between the rollers.

On the drawings the frames $i$ are shown permanently fitted on the spindles $a$, $b$, but, if desired, the frames $i$ may be removably fitted thereon, and the worms $j$, instead of being held in place by the caps $i^1$, may be carried in other suitable bearings.

In certain cases, for light drives, instead of using centrally arranged worm gear, I may provide worm or helical tooth gear at one or the other end of the spindles $a$, $b$, as shown at Figs. 4, 8, and 9. In this case the spindles $a$, $b$, are screw-threaded at one end only. The screwed part $d$ of the spindles $a$, $b$, is provided, as before, with the nuts $n^1$, $o^1$, and rollers $q$, $q^1$, and, on the other end of the spindles $a$, $b$, are loosely fitted the nuts $n$ and $o$, carrying rollers $q$, $q^1$. In proximity to the nuts $n$ and $o$, and loosely fitted on the spindles $a$, $b$, are gear frames $t$ which support worm or helical tooth gear wheels $w$, the latter being preferably held in place by removable caps $t^1$, and gearing with gear wheels $u$ keyed to the spindles $a$, $b$. The worm wheels $w$ are splined upon a spindle $v$ so that the latter may be withdrawn when required, and longitudinal movement of the nuts $n$, $o$, and gear frames $t$, upon the spindles $a$, $b$, is prevented by means of nuts $x$ and collars $y$.

When the spindle $v$ is rotated by the handle $m^1$, the spindles $a$, $b$, are rotated, as before, through the worm gear $u$, $w$, the spindles $a$, $b$, rotating freely in the nuts $n$, $o$, and gear frames $t$, but drawing up the nuts $n^1$ and $o^1$, and their rollers $q$ and $q^1$.

It will, of course, be understood that, if desired, the driving gear shown at Fig. 4 may be fitted upon the end of right and left-hand screwed spindles $a$, $b$, such as shown at Fig. 1, in which case the nuts $n$, and $o$, as well as the nuts $n^1$, $o^1$, would be threaded upon the screws.

If desired, in lieu of the arrangement shown at Fig. 4, each nut $n$ or $o$, and its frame $t$ may be formed in one casting.

It will be noted that the bars $p$, $p^1$, project out some distance beyond the spindle $b$; this is to allow of the adjustment of the said spindle $b$ on the bars to suit the width of the belt being operated on, the apparatus having bars $p$, $p^1$, of such length as to suit all ordinary widths of belting. The spindles $l$ and $v$ are made of corresponding length to the bars $p$, $p^1$. A series of interchangeable rollers $q$, $q^1$, of different lengths would, preferably, be provided so that rollers of the proper length to suit the width of belt could be threaded on the bars $p$, $p^1$. The rollers $q$ and $q^1$ may be of either metal or wood, and, if desired, may be grooved, corrugated or fluted, to obtain a better grip upon the belt. At Fig. 5 of the drawings I have shown the roller $q$ as made of wood, while the roller $q^1$ is of hollow corrugated metal.

It will be seen, owing to the fact that the parts of the stretcher can be readily assembled together, without the use of any tools, and thereafter the ends of the belt be quickly drawn up, that repairs can be effected in much less time and with considerably less trouble than heretofore.

Having now fully described my invention what I claim and desire to secure by Letters Patent is:—

1. A belt stretcher comprising in combination, two pairs of rollers, means for carrying the rollers, one roller of each pair being concentrically mounted on its carrying means and the other roller of each pair being eccentrically mounted on its carrying means, and means for moving one pair of rollers toward the other.

2. A belt stretcher comprising in combination, two pairs of rollers, means for carrying the rollers, one roller of each pair being concentrically mounted on its carrying means and the other roller of each pair being eccentrically mounted on its carrying means and means for moving the pairs of rollers simultaneously toward one another.

3. A belt stretcher comprising, in combination, two pairs of rollers, means for carrying the rollers, one roller of each pair being concentrically mounted on its carrying means, and the other roller of each pair being eccentrically mounted on its carrying means and screw means for moving one pair of rollers toward the other.

4. A belt stretcher comprising, in combination, two pairs of rollers, means for carrying the rollers, one roller of each pair being concentrically mounted on its carrying means and the other roller of each pair being eccentrically mounted on its carrying means and screw means for moving the pairs of rollers simultaneously toward one another.

5. A belt stretcher comprising in combination, two pairs of rollers, round bars for carrying the rollers, one roller of each pair being concentrically mounted on its bar and the other roller of each pair being eccentrically mounted on its bar and means for moving one pair of rollers toward the other.

6. A belt stretcher comprising in combination, two pairs of rollers, round bars for carrying the rollers, one roller of each pair being concentrically and removably mounted on its bar and the other roller of each pair being eccentrically mounted on its bar and means for moving one pair of rollers toward the other.

7. A belt stretcher comprising, in combination, two pairs of rollers, round bars for carrying the rollers, one roller of each pair being concentrically and removably mounted on its bar and the other roller of each pair being eccentrically and removably mounted on its bar and means for moving one pair of rollers toward the other.

8. A belt stretcher comprising in combination two pairs of rollers, round bars for carrying the rollers, one roller of each pair being concentrically mounted on its bar and the other roller of each pair being eccentrically mounted on its bar, nuts in which the bars are fitted and screw means for moving the nuts.

9. A belt stretcher comprising in combination two screwed and parallel spindles, nuts thereon, round bars passed through the nuts at right angles to the spindles said bars being arranged in pairs, a concentric roller and an eccentric roller mounted on the one pair of bars, a concentric roller and an eccentric roller mounted on the other pair of bars and means for rotating the screwed spindles.

10. A belt stretcher comprising in combination, two screwed and parallel spindles, nuts thereon, round bars passed through the nuts at right angles to the spindles said bars being arranged in pairs, a concentric roller and an eccentric roller mounted on the one pair of bars, a concentric roller and an eccentric roller mounted on the other pair of bars, worm gear for rotating the screwed spindles and a removable crank shaft for operating said worm gear.

11. A belt stretcher comprising, in combination, two screwed and parallel spindles, nuts thereon, round bars passed through the nuts at right angles to the spindles, said bars being arranged in pairs, a concentric roller and an eccentric roller mounted on the one pair of bars, a concentric roller and an eccentric roller mounted on the other pair of bars, a worm wheel on each spindle, a worm gearing with each worm wheel, means on the spindles for holding the worms in position and a shaft removably passed through said worms and adapted to operate the same.

12. A belt stretcher comprising, in combination, two parallel spindles each having a right hand and a left hand screw thread thereon, nuts on the screwed parts of the spindles each nut having two holes therein, round bars passed through each nut, concentric and eccentric rollers in pairs threaded on said bars, frames on the spindles, gearing for driving the spindles and means for operating the gear.

13. A belt stretcher comprising, in combination, two parallel spindles each having a right hand and a left hand screw thread thereon, nuts on the screwed parts of the spindles each nut having two holes therein, round bars passed through each nut, concentric and eccentric rollers in pairs threaded on said bars, frames on the spindles, a worm wheel on each spindle, a worm carried by each frame and a removable driving spindle passed through said worms.

14. A belt stretcher comprising, in combination, two parallel spindles, nuts thereon, bars passed removably through the nuts and at right angles to the spindles, concentric and eccentric rollers removably mounted on the bars for gripping the belt being stretched and means for rotating the spindles, the parts of the belt stretcher being adjustable to suit belts of different widths.

15. A belt stretcher comprising, in combination, two parallel spindles, nuts thereon, bars passed removably through the nuts and at right angles to the spindles, concentric and eccentric rollers removably mounted on the bars for gripping the belt being stretched, worm gear for rotating the spindles and means for operating the gear, the parts of the belt stretcher being adjustable to suit belts of different widths.

In testimony whereof I affix my signature in presence of two witnesses.

FREDERICK THOMAS.

Witnesses:
 G. HELYER,
 N. D. BELLY.